US011603929B2

United States Patent
Nakazawa et al.

(10) Patent No.: US 11,603,929 B2
(45) Date of Patent: Mar. 14, 2023

(54) WIRE FOR PISTON RING, AND MANUFACTURING METHOD OF PISTON RING

(71) Applicant: TPR Co., Ltd., Tokyo (JP)

(72) Inventors: Atsushi Nakazawa, Tokyo (JP); Satoshi Minemura, Tokyo (JP); Masahide Hama, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 17/608,176

(22) PCT Filed: Dec. 17, 2020

(86) PCT No.: PCT/JP2020/047139
§ 371 (c)(1),
(2) Date: Nov. 2, 2021

(87) PCT Pub. No.: WO2021/220549
PCT Pub. Date: Nov. 4, 2021

(65) Prior Publication Data
US 2022/0145990 A1 May 12, 2022

(30) Foreign Application Priority Data
Apr. 30, 2020 (JP) .............. JP2020-080314

(51) Int. Cl.
*F16J 9/20* (2006.01)
*B23P 15/06* (2006.01)

(52) U.S. Cl.
CPC .............. *F16J 9/20* (2013.01); *B23P 15/06* (2013.01)

(58) Field of Classification Search
CPC .............. F16J 9/00; F16J 9/20; B23P 15/06
See application file for complete search history.

(56) References Cited

U.S. PATENT DOCUMENTS

| | | | |
|---|---|---|---|
| 2,940,803 A * | 6/1960 | Phillips | F16J 9/20 277/444 |
| 5,901,963 A | 5/1999 | Hite et al. | |
| 2015/0198249 A1 | 7/2015 | Watanabe | |
| 2018/0023702 A1* | 1/2018 | Nakamura | F16J 9/06 277/434 |

(Continued)

FOREIGN PATENT DOCUMENTS

| EP | 2045488 A1 | 4/2009 |
|---|---|---|
| JP | 2009-091927 A | 4/2009 |
| JP | 2014-035038 A | 2/2014 |

(Continued)

OTHER PUBLICATIONS

International Search Report issued in PCT/JP2020/047139 dated Feb. 22, 2021.

(Continued)

*Primary Examiner* — Eugene G Byrd
(74) *Attorney, Agent, or Firm* — Marshall, Gerstein & Borun LLP

(57) ABSTRACT

In a surface of a wire, a first side surface forming an outer circumferential surface in a piston ring includes a tapered surface and a protruding surface, the protruding surface is divided into a first part and a second part by a first virtual surface extending from the tapered surface, and the first part includes a top and is formed in a protruding shape.

5 Claims, 16 Drawing Sheets

(56) References Cited

U.S. PATENT DOCUMENTS

2018/0031127 A1* 2/2018 Takezawa ................ F16J 9/20

FOREIGN PATENT DOCUMENTS

| JP | 5564082 B2 | 7/2014 |
| JP | 2016-114089 A | 6/2016 |
| JP | 2016-169791 A | 9/2016 |

OTHER PUBLICATIONS

Office Action issued in corresponding Japanese Patent Application No. 2020-080314 dated Jul. 28, 2020.
Decision to Grant a Patent issued in corresponding Japanese Patent Application No. 2020-080314 dated Oct. 27, 2020.

* cited by examiner

FIG. 10
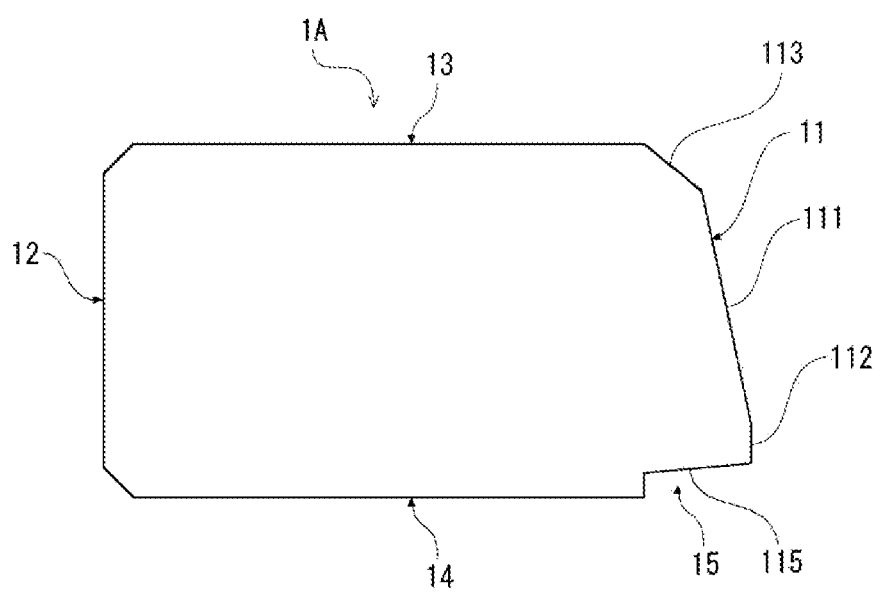
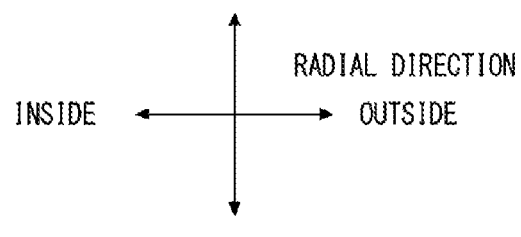

WIRE FOR PISTON RING, AND MANUFACTURING METHOD OF PISTON RING

TECHNICAL FIELD

The present invention relates to a wire for a piston ring, and a manufacturing method of a piston ring.

BACKGROUND ART

An internal combustion engine mounted in a general car adopts a configuration where a piston mounted in a cylinder is provided with a plurality of piston rings. The piston rings are roughly divided into a compression ring (a pressure ring) disposed on a combustion chamber side and an oil ring disposed on a crank chamber side, in accordance with functions.

The compression ring has a gas seal function of maintaining airtightness to inhibit outflow (blowby) of combustion gas from the combustion chamber side to the crank chamber side, and a heat radiating function of transmitting and radiating heat of the piston to the cylinder. The oil ring has an oil seal function of scraping off excessive engine oil (lubricant) adhered to an inner wall of the cylinder (hereinafter, the cylinder inner wall) to the crank chamber side to inhibit inflow (oil rise) of the oil to the combustion chamber side. These piston rings can be manufactured by a manufacturing method including a coiling step of plastically processing a strip-shaped wire into an annular shape, a cutting step of cutting the wire into the annular shape to obtain a ring, a surface treatment step of subjecting the ring to surface treatment, and a polishing step of polishing a surface of the ring.

Here, the compression ring having at least a part of an outer circumferential surface that is formed in a tapered shape is known. By providing the outer circumferential surface of the compression ring with a proper tapered surface, the oil that cannot be completely scraped off with the oil ring during a lowering stroke of the piston can be suitably scraped off, and an oil film can be formed due to a wedge effect between the tapered surface and the cylinder inner wall during a rising stroke of the piston. Such a tapered shape is often used in a second ring (a second pressure ring) that is a second compression ring from the combustion chamber side among a plurality of compression rings provided in the piston.

Furthermore, it is known that in the compression ring having the tapered outer circumferential surface, a flat contact surface (a sliding surface) is formed on the outer circumferential surface to acquire initial adaptivity to the cylinder inner wall. The contact surface is formed by lapping the outer circumferential surface of the ring in the polishing step. For obtaining satisfactory initial adaptivity, it is preferable that the contact surface is formed with a uniform width (contact width) over an entire circumference. For obtaining the uniform contact width, a lapping time in the polishing step (a length of a time to polish) is required to be lengthened. However, as the lapping time lengthens, the contact width tends to increase. If the contact width excessively increases, drop in surface pressure relative to the cylinder inner wall is caused, and oil scrape-off performance might deteriorate. To cope with this problem, it is considered that tension of the compression ring is increased to acquire the surface pressure, but in this case, there is concern that friction increases and that fuel efficiency deteriorates.

In this context, in Patent Document 1, it is disclosed that in a wire for a compression ring having a tapered outer circumferential surface, a first tapered part and a second tapered part having a taper angle larger than a taper angle of the first tapered part are formed on a surface forming an outer circumferential surface of the ring. A technology described in Patent Document 1 is intended to obtain a small and uniform contact width by forming a contact surface on a corner portion at a tip end of the second tapered part through lapping.

CITATION LIST

Patent Document

[Patent document 1] Japanese Patent No. 5564082

SUMMARY OF THE INVENTION

Technical Problem

For uniformly obtaining a smaller contact width, it is necessary that a part as a polishing target to form a contact surface is made thinner (sharper). However, a wire is molded by drawing with a die, and hence, a corner R dependent on a shape of the die is molded on a corner portion of the wire. Therefore, in the above described conventional technology, it is difficult to decrease a width of the part as the polishing target beyond restrictions made by the shape of the die.

The present invention has been developed in view of the above described situation, and an object thereof is to provide a technology capable of forming a contact surface with a small and uniform contact width in a piston ring having a tapered outer circumferential surface.

Solution to Problem

To solve the above problem, the present invention adopts following configuration. That is, the present invention provides a wire for a piston ring, the wire forming a material of the piston ring to be mounted in a ring groove of a piston in an internal combustion engine, the wire including a first side surface forming an outer circumferential surface in the piston ring, a second side surface forming an inner circumferential surface in the piston ring, a third side surface connecting the first side surface and the second side surface and forming a surface facing an inner wall of the ring groove on a combustion chamber side in the piston ring, and a fourth side surface connecting the first side surface and the second side surface and forming a surface facing an inner wall of the ring groove on a crank chamber side in the piston ring, wherein the first side surface includes a tapered surface inclined to increase a width toward a first direction that is a direction from a side of the third side surface toward a side of the fourth side surface in a cross section orthogonal to an extending direction of the wire, and a protruding surface connecting the tapered surface and a predetermined surface located on the first direction side of the tapered surface and protruding on a side of a second direction that is a direction from the second side surface toward the first side surface, the protruding surface is divided, by a first virtual surface extending from the tapered surface to the first direction side, into a first part connected to the tapered surface and protruding to the second direction side of the first virtual surface, and a second part connecting the first part and the predetermined surface and located on an opposite side of the second direction of the first virtual surface, and the first part includes a top located on a most second direction side in the first side surface and is formed in a protruding shape on the second direction side.

When the piston ring is manufactured using this wire, in a coiling step, the first part of the protruding surface is crushed on a first virtual surface side, the protruding surface is deformed, and a corner portion protruding outward in a radial direction can be obtained. Then, in a polishing step, a tip end of the corner portion is polished, and a flat contact surface (sliding surface) can be obtained. That is, in the wire according to the present invention, the corner portion as a polishing target to form the contact surface is formed in the coiling step. Consequently, according to the wire of the present invention, the corner portion can be formed sharp independent of a shape of a die for manufacturing the wire. As a result, according to the wire of the present invention, a small contact width can be uniformly obtained. Here, the contact width indicates a width of the contact surface in an axial direction of the piston ring.

Also, in the wire according to the present invention, in the cross section orthogonal to the extending direction of the wire, an area of a first region that is a region surrounded by the first part and the first virtual surface may be smaller than or equal to an area of a second region that is a region surrounded by the second part, the first virtual surface and a second virtual surface extending from the predetermined surface to intersect the first virtual surface. The first region is a region indicating a raised portion from the first virtual surface in the wire. A portion of the wire that is included in the first region is moved to the second region by the coiling step, and thereby, the corner portion is formed. According to the wire of the present invention, the area of the first region is set to be smaller than or equal to the area of the second region, and hence, the corner portion can be formed in the second region. As a result, the corner portion can be formed sharp, and the small contact width can be obtained.

Further, in the wire according to the present invention, the first side surface may include, as the predetermined surface, an inclined surface connecting the protruding surface and the fourth side surface and inclined to decrease a width toward the first direction in a cross section orthogonal to the extending direction of the wire.

Also, in the wire according to the present invention, the first side surface may include a cut surface connecting the protruding surface and the fourth side surface, the cut surface may include a first undercut surface as the predetermined surface, connected to the protruding surface, and a second undercut surface connecting the first undercut surface and the fourth side surface, and an inclination angle of the second undercut surface to the second direction may be larger than an inclination angle of the first undercut surface to the second direction.

It is preferable that when a distance between a third virtual surface extending from the fourth side surface in the second direction and the top parallel to the first direction is H1, a distance between the first virtual surface and the top vertical to the first virtual surface is h1, a width of the first part intersecting the first virtual surface in a direction parallel to the first virtual surface in the cross section orthogonal to the extending direction of the wire is K1, and an inclination angle of the predetermined surface to the second direction is θ1, conditions are satisfied:

0.01 mm≤H1≤0.2 mm;

0.005 mm≤h1≤0.02 mm;

0.05 mm≤K1≤0.15 mm; and

θ1≥3°.

Thus, a smaller and uniform contact width can be obtained.

Also, the present invention can be specified as a method of manufacturing a piston ring from a wire. That is, the present invention provides a manufacturing method of a piston ring to be mounted in a ring groove of a piston in an internal combustion engine, the wire including a first side surface forming an outer circumferential surface in the piston ring, a second side surface forming an inner circumferential surface in the piston ring, a third side surface connecting the first side surface and the second side surface and forming a surface facing an inner wall of the ring groove on a combustion chamber side in the piston ring, and a fourth side surface connecting the first side surface and the second side surface and forming a surface facing an inner wall of the ring groove on a crank chamber side in the piston ring, the first side surface including a tapered surface inclined to increase a width toward a first direction that is a direction from a side of the third side surface toward a side of the fourth side surface in a cross section orthogonal to an extending direction of the wire, and a protruding surface connecting the tapered surface and a predetermined surface located on the first direction side of the tapered surface and protruding on a side of a second direction that is a direction from the second side surface toward the first side surface, the protruding surface being divided, by a first virtual surface extending from the tapered surface to the first direction side, into a first part connected to the tapered surface and protruding to the second direction side of the first virtual surface, and a second part connecting the first part and the predetermined surface and located on an opposite side of the second direction of the first virtual surface, the first part including a top located on a most second direction side in the first side surface and being formed in a protruding shape on the second direction side, the manufacturing method of the piston ring including a coiling step of sending out the wire, and applying external force to the wire to form the wire in an annular shape, a cutting step of cutting the wire formed in the annular shape to obtain a ring, and a polishing step of polishing a surface of the ring, wherein in the coiling step, the first part is crushed on a side of the first virtual surface by the external force acting on the first side surface, and the protruding surface is deformed to form a corner portion, and in the polishing step, a tip end of the corner portion is polished to form a flat contact surface.

Also, the manufacturing method of the piston ring according to the present invention may include, prior to the polishing step, a surface treatment step of forming, on an outer circumferential surface of the ring, a hard coating including a layer of at least one of a PVD treated film, a DLC film, and a chrome-plated film. According to this step, frictional force in the outer circumferential surface of the piston ring can be reduced, and abrasion resistance can be improved. Note that "the physical vapor deposition (PVD) treated film" indicates a coating formed by a PVD method. The PVD method is a type of vapor deposition method of adhering particles emitted from a target to form a film on a surface of an opposite material, and is also called physical vapor phase growth. Also, "the diamond like carbon (DLC) film" mainly indicates an amorphous hard carbon film composed of hydrocarbon or an allotrope of carbon. Further, "the chrome-plated film" indicates a coating formed by chrome plating. Also, a nitriding step may be included prior to the polishing step.

Advantageous Effects of Invention

According to the present invention, a contact surface with a small and uniform contact width can be formed in a piston ring having a tapered outer circumferential surface.

BRIEF DESCRIPTION OF THE DRAWINGS

FIG. 10 is a view illustrating a second ring manufactured using a wire according to Embodiment 2.

DESCRIPTION OF EMBODIMENTS

Hereinafter, embodiments of the present invention will be described with reference to the drawings. In the following embodiments, a wire according to the present invention is applied to a second ring that is a compression ring as an example of a piston ring. However, the present invention is not limited to this example. The wire according to the present invention is also applicable to a top ring or an oil ring. Furthermore, configurations described in the following embodiments are not intended to restrict the technical scope of the invention only to the configurations unless otherwise stated.

Note that in the following description, "a circumferential length direction" indicates a circumferential length direction of the second ring unless otherwise stated. "A radial direction" indicates a radius direction of the second ring unless otherwise stated. "An inside in the radial direction" indicates an inner circumferential surface side of the second ring, and "an outside in the radial direction" indicates an opposite side (i.e., an outer circumferential surface side of the second ring). "An axial direction" indicates a direction along a central axis of the second ring unless otherwise stated. "An upper wall" of a ring groove of a piston indicates an inner wall on a combustion chamber side in an inner wall of the ring groove, and "a lower wall" indicates an inner wall on a crank chamber side. Further, "an extending direction" indicates an extending direction of the wire unless otherwise stated. "An upside" of the second ring or the wire indicates an upper wall side of the ring groove when the second ring is provided in the ring groove, and "a downside" indicates a lower wall side of the ring groove when the second ring is provided in the ring groove.

Embodiment 1

Figure 1:
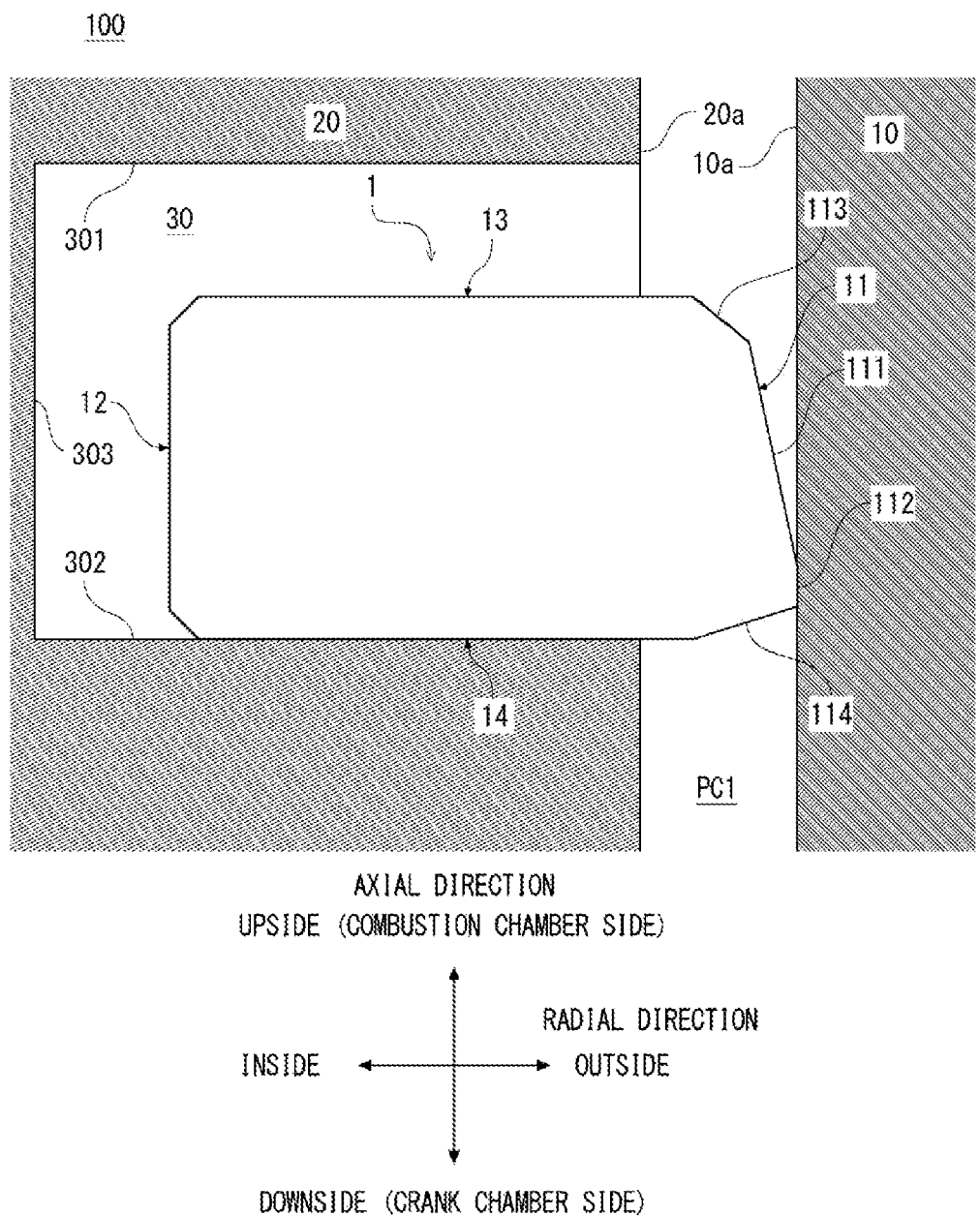
FIG. 1 is a view illustrating a state where a second ring manufactured using a wire according to Embodiment 1 is provided in an internal combustion engine.

FIG. 1 is a view illustrating a state where a second ring manufactured using a wire according to Embodiment 1 is provided in an internal combustion engine. FIG. 1 illustrates a cross section orthogonal to a circumferential length direction of the second ring. An internal combustion engine 100 illustrated in FIG. 1 includes a cylinder 10, a piston 20 for the internal combustion engine (hereinafter, the piston 20) mounted in the cylinder 10, and an unillustrated combustion chamber and crank chamber. An upside in a case where FIG. 1 is seen as a plan view is a combustion chamber side, and a downside is a crank chamber side. As illustrated in FIG. 1, in the internal combustion engine 100, a predetermined separation distance is acquired between a cylinder inner wall 10a that is an inner circumferential surface of the cylinder 10 and a piston outer circumferential surface 20a that is an outer circumferential surface of the piston 20, and thereby, a gap PC1 is formed. A ring groove 30 having a substantially rectangular cross section is formed in the piston outer circumferential surface 20a. The ring groove 30 includes an upper wall 301 formed on the combustion chamber side, a lower wall 302 formed on the crank chamber side and facing the upper wall 301, and a connection wall 303 connecting inner circumferential edges of the upper wall 301 and the lower wall 302 to each other. A second ring 1 is mounted in the ring groove 30.

[Second Ring]

The second ring 1 is a sliding member that slides along the cylinder inner wall 10a in response to reciprocating motion of the piston 20. As illustrated in FIG. 1, a surface of the second ring 1 includes an outer circumferential surface 11, an inner circumferential surface 12, an upper surface 13 and a lower surface 14. The outer circumferential surface 11 of the second ring 1 is formed in a so-called tapered shape. In a state (use state) where the second ring 1 is mounted in the ring groove 30, the outer circumferential surface 11 slides in contact with the cylinder inner wall 10a, the inner circumferential surface 12 faces the connection wall 303, the upper surface 13 faces the upper wall 301, and the lower surface 14 faces the lower wall 302. The second ring 1 has an annular shape with an abutment (not illustrated) formed therein. Also, the second ring 1 has self-tension so that the outer circumferential surface 11 presses the cylinder inner wall 10a when mounted in the ring groove 30. Also, a hard coating may be formed on the outer circumferential surface 11 of the second ring 1 as described later.

As illustrated in FIG. 1, the outer circumferential surface 11 of the second ring 1 includes a tapered surface 111, a contact surface 112, a first inclined surface 113 and a second inclined surface 114. The tapered surface 111 has a tapered shape inclined to increase a diameter toward downside. The contact surface (sliding surface) 112 is a surface forming an outermost circumferential part of the second ring 1. The contact surface 112 is connected to a lower edge of the tapered surface 111, extends flatly along an axial direction, and is formed over an entire circumference of the second ring 1. The contact surface 112 slides in contact with the cylinder inner wall 10a in the use state of the second ring 1, and scrapes off oil in the gap PC1. The contact surface 112 is formed, and thereby, initial adaptivity to the cylinder inner wall 10a is acquired. The first inclined surface 113 is a surface connecting an outer circumferential edge of the upper surface 13 and an upper edge of the tapered surface 111, and is inclined to increase the diameter toward the downside. The second inclined surface 114 is a surface connecting a lower edge of the contact surface 112 and an outer circumferential edge of the lower surface 14, and is inclined to decrease the diameter toward the downside. Note that each of the first inclined surface 113 and the second inclined surface 114 may be a surface represented not only with a straight line but also with a curved line in a cross section illustrated in FIG. 2, and the first inclined surface 113 and upper surface 13, or the second inclined surface 114 and lower surface 14 may be connected by a curved line with a predetermined radius.

[Wire]

Figure 2:
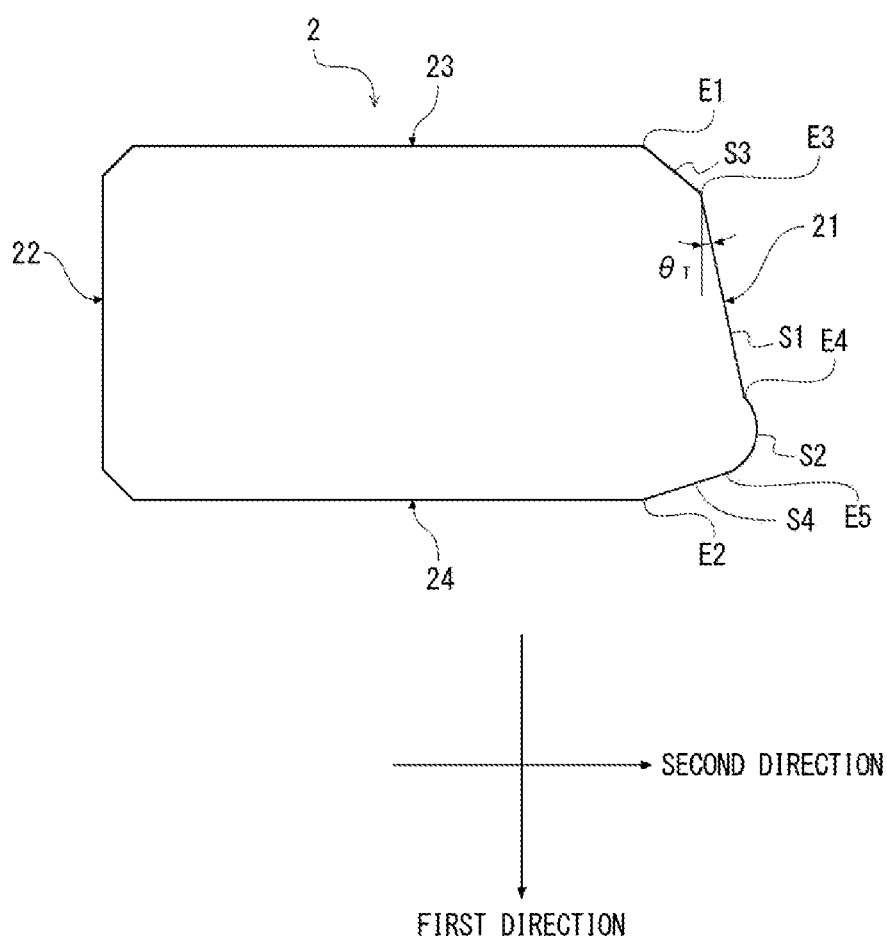
FIG. 2 is a view illustrating the wire according to Embodiment 1.

FIG. 2 is a view illustrating a wire 2 according to Embodiment 1. FIG. 2 illustrates a cross section orthogonal to an extending direction of the wire 2. The wire 2 according to Embodiment 1 is a member forming a material of the second ring 1 described above. The wire 2 is mainly made of a steel material (steel), and formed in a long strip shape. Examples of the steel material that is the material of the wire 2 include a carbon steel material, stainless steel material, an alloy steel, a cast iron material and a cast steel material. However, the material of the wire 2 is not limited to these examples, and a titanium-based, copper-based or aluminum-based material may be used.

As illustrated in FIG. 2, a surface of the wire 2 includes a first side surface 21, a second side surface 22, a third side surface 23 and a fourth side surface 24. The first side surface 21 is a surface forming the outer circumferential surface 11 in the second ring 1. The second side surface 22 is a surface forming the inner circumferential surface 12 in the second ring 1. The third side surface 23 is a surface connecting the first side surface 21 and the second side surface 22, and forming the upper surface 13 in the second ring 1. The fourth side surface 24 is a surface connecting the first side surface 21 and the second side surface 22, and forming the lower surface 14 in the second ring 1. The third side surface 23 and the fourth side surface 24 are formed on flat surfaces parallel to each other. Here, a direction orthogonal to the extending direction of the wire 2 and from a third side surface 23 side toward a fourth side surface 24 side is referred to as a first direction. The first direction corresponds to a downward direction in the axial direction in the second ring 1. Further, a direction orthogonal to the extending direction of the wire 2 and from a second side surface 22 side toward a first side surface 21 side is referred to as a second direction. The second direction corresponds to an outward direction in a radial direction in the second ring 1.

The first side surface 21 of the wire 2 includes a tapered surface S1, a protruding surface S2, a first inclined surface S3 and a second inclined surface S4. The first inclined surface S3 is a surface forming the first inclined surface 113 in the second ring 1, connected to an edge E1 of the third side surface 23 on a second direction side and inclined to increase a width toward the first direction. The second inclined surface S4 is a surface forming the second inclined surface 114 in the second ring 1, inclined to decrease the width toward the first direction and connected to an edge E2 of the fourth side surface 24 on the second direction side. The tapered surface S1 is a surface forming the tapered surface 111 in the second ring 1, connected to an edge E3 of the first inclined surface S3 on the second direction side and inclined to increase the width toward the first direction. The protruding surface S2 is a surface forming the contact surface 112 in the second ring 1, connects an edge E4 of the tapered surface S1 on a first direction side and an edge E5 of the second inclined surface S4 on the second direction side and protrudes to the second direction side. As illustrated in FIG. 2, the second inclined surface S4 is located on the first direction side of the tapered surface S1, and connects the protruding surface S2 and the fourth side surface 24. The second inclined surface S4 corresponds to "a predetermined surface" according to the present invention.

Figure 3:
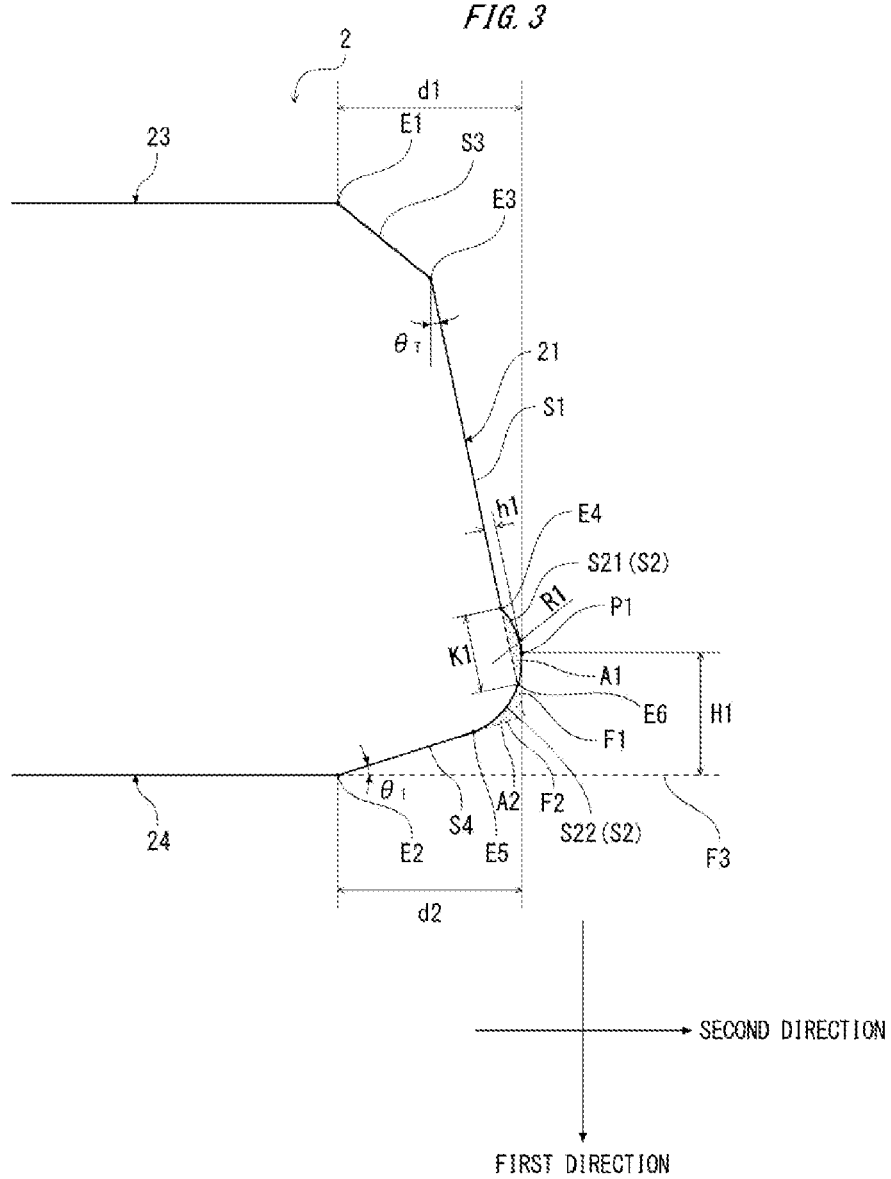
FIG. 3 is a view for explaining a first side surface of the wire according to Embodiment 1.

FIG. 3 is a view for explaining the first side surface 21 of the wire 2 according to Embodiment 1. Here, a virtual surface extending from the tapered surface S1 on the first direction side is referred to as a first virtual surface, and denoted with reference symbol F1. Further, a virtual surface extending from the second inclined surface S4 to intersect the first virtual surface is referred to as a second virtual surface, and denoted with reference symbol F2. As illustrated in FIG. 3, the protruding surface S2 is divided into a first part S21 and a second part S22 by the first virtual surface F1. The first part S21 is connected to the edge E4 of the tapered surface S1 on the first direction side, and protrudes from the first virtual surface F1 to the second direction side. Further, the first part S21 includes a top P1 located on a most second direction side in the first side surface 21 and is curved in a protruding shape on the second direction side. That is, the wire 2 is raised from the first virtual surface F1 in the first part S21. On the other hand, the second part S22 connects an edge E6 of the first part S21 on the first direction side and the edge E5 of the second inclined surface S4 on the second direction side, and is located on a side opposite to the first virtual surface F1 in the second direction. That is, the wire 2 is recessed from the first virtual surface F1 in the second part S22. Here, a region surrounded by the first part S21 and the first virtual surface F1 is referred to as a first region A1. That is, the first region A1 indicates a part raised from the first virtual surface F1 in the wire 2. Further, a region surrounded by the second part S22, the first virtual surface F1 and the second virtual surface F2 is referred to as a second region A2.

[Manufacturing Method of Piston Ring]

Figure 4:
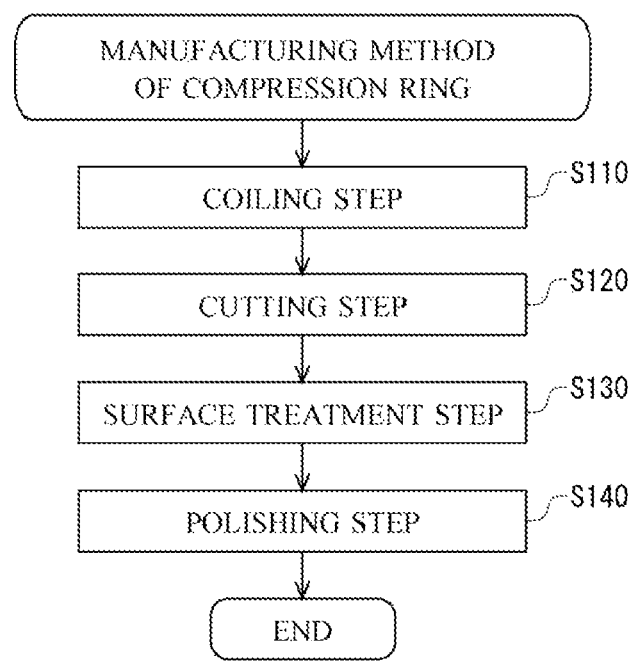
FIG. 4 is a diagram illustrating steps of a manufacturing method of the second ring according to Embodiment 1.

Next, description will be made as to a method of manufacturing the second ring 1 illustrated in FIG. 1 by use of the wire 2 according to Embodiment 1. FIG. 4 is a diagram illustrating steps of the manufacturing method of the second ring according to Embodiment 1. As illustrated in FIG. 4, the manufacturing method according to Embodiment 1 includes a coiling step, a cutting step, a surface treatment step and a polishing step. Hereinafter, the respective steps will be described.

Figure 5:
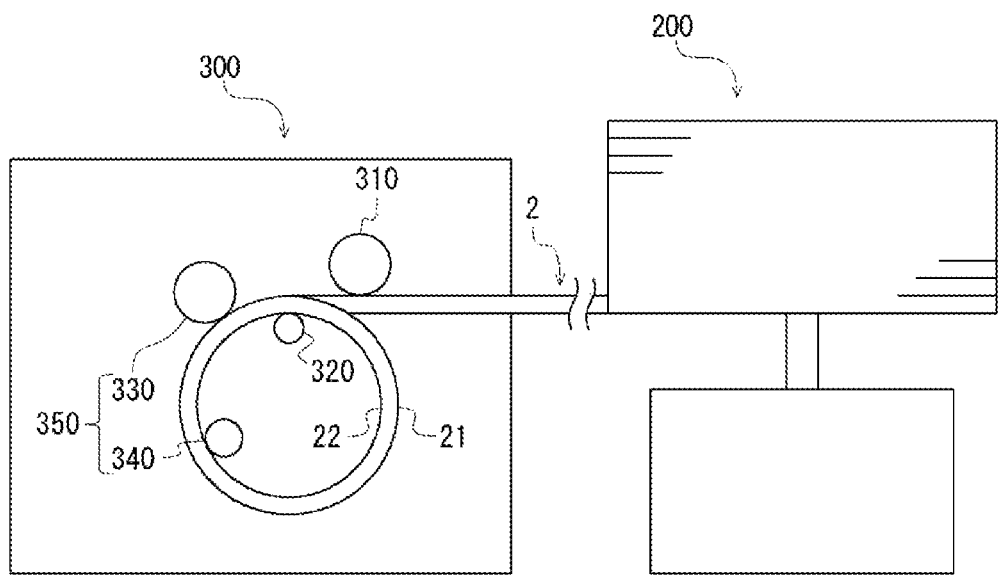
FIG. 5 is a view for explaining a coiling step.

First, in a coiling step S110, external force is applied to the wire 2 to be sent out to form the wire 2 in an annular shape. FIG. 5 is a view for explaining the coiling step. As illustrated in FIG. 5, in the coiling step, the wire 2 is pulled out from a coil master 200 around which the wire 2 is wound and sent out to a coiling device 300. The coiling device 300 includes a holding roller 31, a core metal 320, a bending roller 330, and a stretch 340. The holding roller 310 abuts on the first side surface 21 of the wire 2, the core metal 320 abuts on the second side surface 22 of the wire 2, and thereby, the wire 2 sent out from the coil master 200 is guided to a bending and forming unit 350 including the bending roller 330 and the stretch 340. In the bending and forming unit 350, the wire 2 is inserted between the bending roller 330 and the stretch 340, the bending roller 330 is pressed onto the first side surface 21, the stretch 340 is pressed onto the second side surface 22, and thereby, the wire 2 is bent and formed with a predetermined curvature radius. Consequently, the wire 2 is plastically processed in the annular shape so that the first side surface 21 is an outer circumferential surface and the second side surface 22 is an inner circumferential surface.

Next, in a cutting step S120, the wire 2 formed in the annular shape is cut to obtain a ring 3 with an abutment formed therein.

Figure 6:
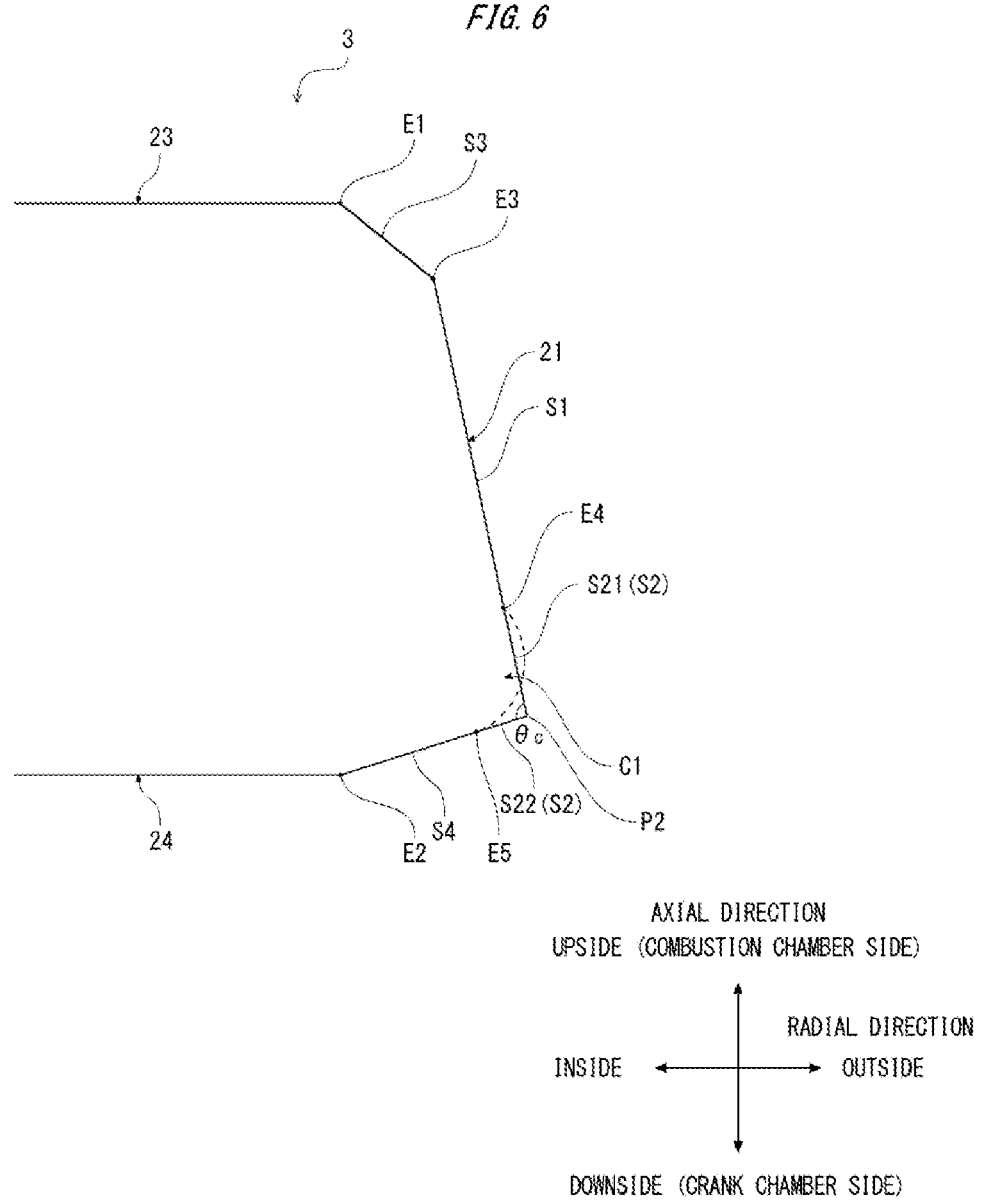
FIG. 6 is a view illustrating an outer circumferential surface of a ring obtained by a cutting step.

FIG. 6 is a view illustrating an outer circumferential surface (the first side surface 21) of the ring 3 obtained by the cutting step. In the coiling step, the first part S21 of the protruding surface S2 is crushed on a first virtual surface F1 side by the external force acting on the first side surface 21 of the wire 2 with the bending roller 330. Consequently, the protruding surface S2 is deformed so that a portion of the wire 2 included in the first region A1 illustrated in FIG. 3 moves to the second region A2. As a result, as illustrated in FIG. 6, a corner portion C1 protruding outward in the radial direction is formed on the outer circumferential surface of the ring 3. The corner portion C1 is formed by the first part S21 substantially flat relative to the tapered surface S1 and the second part S22 substantially flat relative to the second inclined surface S4. A tip end (edge) P2 of the corner portion C1 is located on an outermost side in the radial direction in the outer circumferential surface of the ring 3. In the coiling step, the first part S21 of the protruding surface S2 is crushed with the bending roller 330, and thereby, the surface of the corner portion C1 is smoothed by a rolling effect. Note that in the corner portion C1, the first part S21 may have a shape with a slight amount of protruding shape left therein, instead of being substantially flat relative to the tapered surface S1.

Next, in a surface treatment step S130, a hard coating is formed on the outer circumferential surface of the ring 3. By forming the hard coating on the outer circumferential surface of the ring 3, frictional force in the outer circumferential surface 11 of the second ring 1 can be reduced, and abrasion resistance can be improved. As the hard coating, for example, a component including at least one of a PVD treated film, a DLC film and a chrome-plated film may be adopted. Note that "the physical vapor deposition (PVD) treated film" indicates a coating formed by a PVD method. The PVD method is a type of vapor deposition method of adhering particles emitted from a target to the wire to form a film on a surface of a substance, and is also called physical vapor phase growth. Examples of the PVD method include an ion plating method, a vacuum vapor deposition method, an ion beam vapor deposition method, a sputtering method, a filtered cathodic vacuum arc (FCVA) method and the like. Also, "the diamond like carbon (DLC) film" mainly indicates an amorphous hard carbon film composed of hydrocarbon or an allotrope of carbon. Further, "the chrome-plated film" indicates a coating formed by chrome plating. The chrome plating is also called industrial chrome plating.

Figure 7:
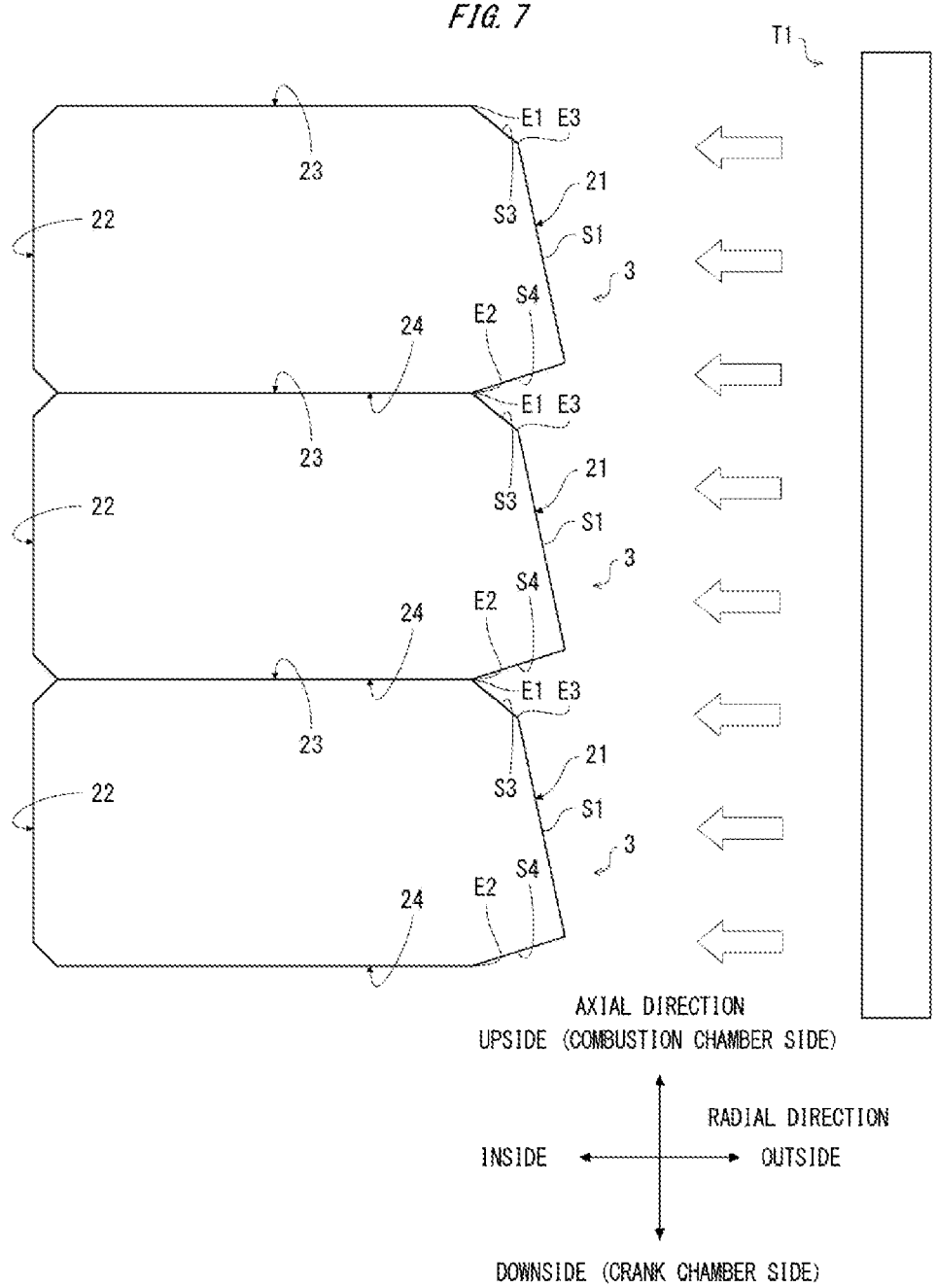
FIG. 7 is a view for explaining a surface treatment step.

In the surface treatment step according to Embodiment 1, a plurality of rings are simultaneously subjected to a film forming treatment by use of the PVD method. FIG. 7 is a view for explaining the surface treatment step. FIG. 7 only illustrates some rings 3 among a plurality of rings 3 for convenience. As illustrated in FIG. 7, the surface treatment step in which the vapor deposition method illustrated in the PVD method is used is performed in a state where the outer circumferential surface (the first side surface 21) of the ring 3 faces a target. At this time, the rings 3 are stacked in the axial direction and arranged in a state where respective central axes are aligned with one another. That is, the rings 3 are coaxially arranged. In this state, a material included in a target T1 is evaporated, and high energy particles are emitted toward the rings 3, and collide with and adhere to the outer circumferential surfaces of the rings 3. Consequently, a hard coating is formed on the outer circumferential surface of each ring 3.

Figure 8:
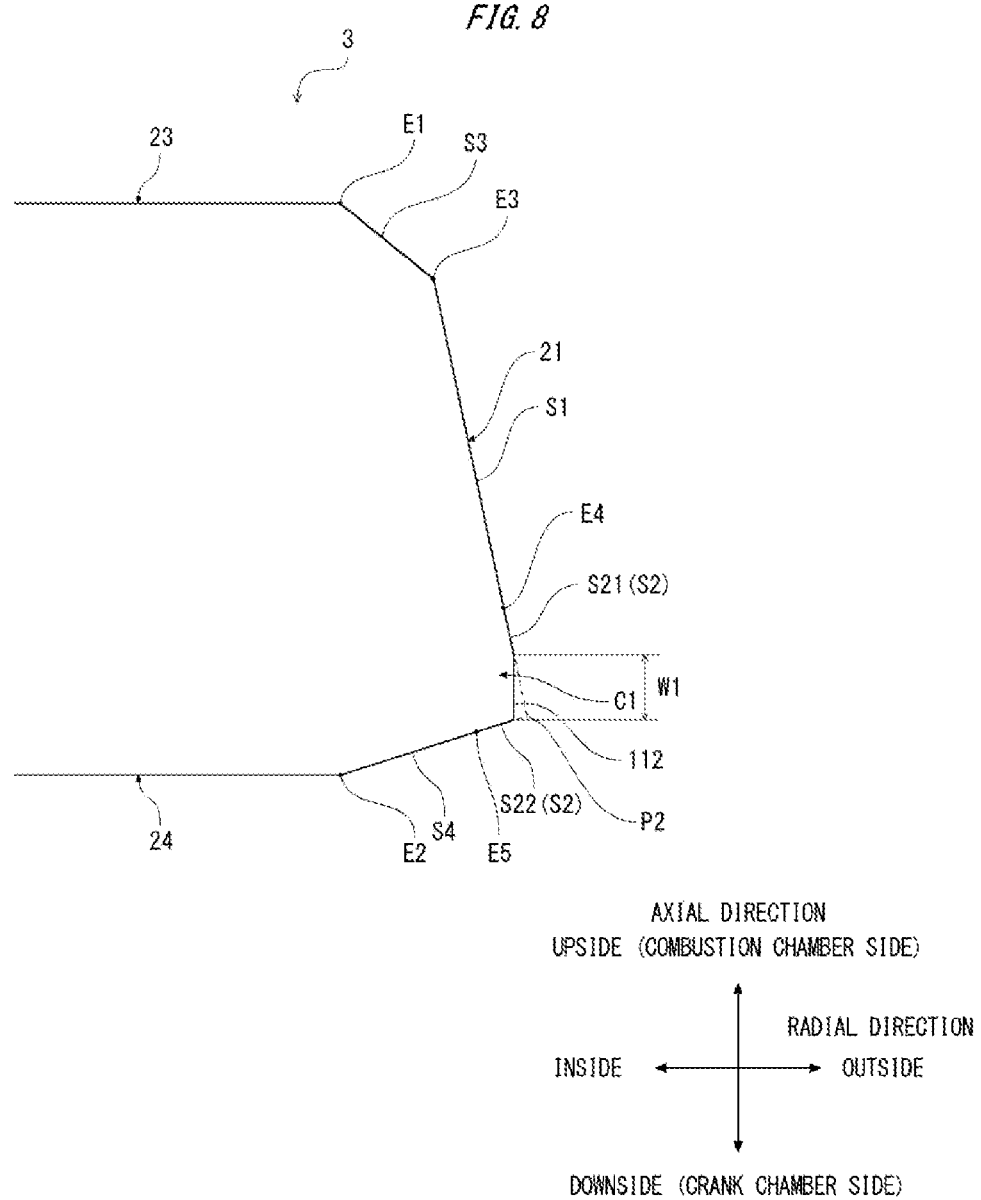
FIG. 8 is a view illustrating the outer circumferential surface of the ring after the polishing step.

Next, in a polishing step S140, the surface of the ring 3 with the hard coating formed thereon is polished by lapping. Specifically, the ring 3 is inserted into a sleeve with an inner diameter equal to an outer diameter of the ring 3, and the ring 3 is slid in an up-down direction in a state where abrasive grains are placed in the sleeve. Consequently, the outer circumferential surface (the first side surface 21) of the ring 3 is slid along an inner circumferential surface of the sleeve, and the outer circumferential surface of the ring 3 is polished. FIG. 8 is a view illustrating the outer circumferential surface of the ring 3 after the polishing step. In the polishing step, the tip end P2 of the corner portion C1 protruding outward in the radial direction in the outer circumferential surface of the ring 3 preferentially comes in contact with the inner circumferential surface of the sleeve. Consequently, the tip end P2 of the corner portion C1 is polished, and the flat contact surface 112 is formed. As described above, the second ring 1 illustrated in FIG. 1 is manufactured.

[Operation and Effect]

As described above, the first side surface 21 of the wire 2 according to Embodiment 1 includes the protruding surface S2 connecting the tapered surface S1 and the second inclined surface S4 and protruding on the second direction side. Further, the protruding surface S2 is divided, by the first virtual surface F1, into the first part S21 connected to the tapered surface S1 and protruding to the second direction side of the first virtual surface F1, and the second part connecting the first part S21 and the second inclined surface S4 and located on an opposite side of the second direction of the first virtual surface F1. Further, the first part S21 includes the top P1 located on the most second direction side in the first side surface 21 and is curved to be raised from the first virtual surface F1.

When the second ring 1 is manufactured using the wire 2, in the coiling step, the first part S21 of the protruding surface S2 is crushed on the first virtual surface side, and the protruding surface S2 is deformed, so that the corner portion C1 protruding outward in the radial direction can be obtained. Then, in the polishing step, the tip end P2 of the corner portion C1 is polished, so that the flat contact surface 112 can be obtained.

Here, for obtaining satisfactory initial adaptivity, it is preferable that the contact surface 112 is formed with a uniform contact width over the entire circumference. Here, "the contact width" indicates a width of the contact surface of the second ring 1 in the axial direction. Note that in FIG. 8, the second ring 1 is referred to as the ring 3, and the contact width is denoted with reference symbol W1. For obtaining the contact surface with the uniform contact width in the entire circumference, a lapping time in the polishing step (a length of a time to polish) is required to be lengthened. However, as the lapping time lengthens, the contact width increases. Therefore, in a case of comparison on condition that the lapping time is the same, as an angle formed by the corner portion decreases, that is, as the corner portion sharpens, a small contact width can be obtained.

Figure 9:
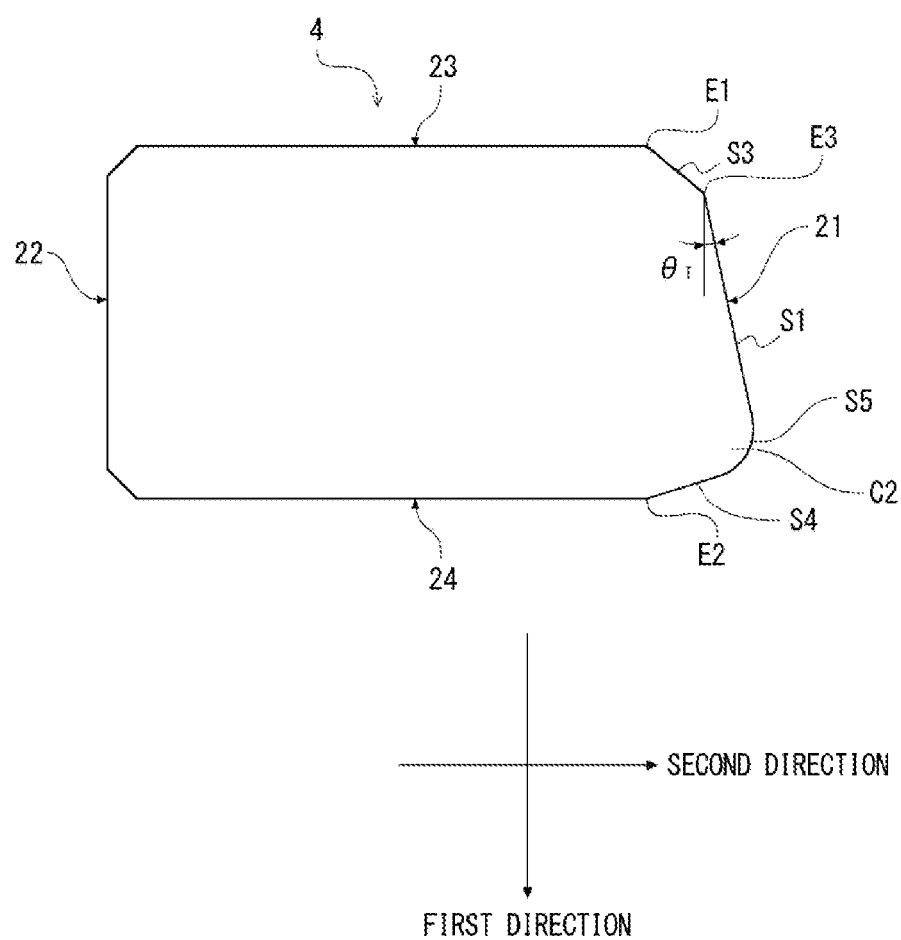
FIG. 9 is a view illustrating a wire according to a comparative example.

FIG. 9 is a view illustrating a wire 4 according to a comparative example. FIG. 9 illustrates a state before the wire 4 is coiled. In the wire 4 according to the comparative example, a corner portion C2 is formed in advance in a portion where a contact surface is to be formed by a polishing step. Here, the wire is usually molded by drawing with a die. Therefore, a corner R dependent on a shape of the die is formed on the corner portion C2 of the wire 4 according to the comparative example. That is, in the wire 4 in which the corner portion C2 as a polishing target to form the contact surface is formed by the drawing with the die, it is difficult to sharpen the corner portion C2 beyond restrictions made by the shape of the die.

On the other hand, in the wire 2 according to Embodiment 1, the corner portion C1 as the polishing target to form the contact surface is formed by the coiling step. Consequently, according to the wire 2, the corner portion C1 can be formed sharp independent of the shape of the die. FIG. 6 denotes an angle of the corner portion C1 with θc. That is, according to the wire 2, θc can be formed small. As a result, according to the wire 2, the contact surface 112 with a contact width smaller than that in the wire 4 according to the comparative example can be uniformly obtained.

Also, in the wire 2 according to Embodiment 1, the first part S21 of the protruding surface S2 is crushed to form the corner portion C1 in the coiling step. Therefore, the surface of the corner portion C1 can be smoothed by the rolling effect in the coiling step. Consequently, since the surface of the corner portion C1 as the polishing target to form the contact surface 112 is smoothed, the contact width can be more uniform.

Here, the wire 2 according to Embodiment 1 is configured so that when the region surrounded by the first part S21 of the protruding surface S2 and the first virtual surface F1 is the first region A1 and the region surrounded by the second part S22 of the protruding surface S2, the first virtual surface F1 and the second virtual surface F2 is the second region A2, an area of the first region A1 is smaller than or equal to an area of the second region A2 in the cross section orthogonal to the extending direction of the wire 2. As described above, in the coiling step, the portion of the wire 2 included in the first region A1 moves to the second region A2 to form the corner portion C1. Therefore, according to the wire 2 of Embodiment 1, since the area of the first region A1 is smaller than or equal to the area of the second region A2, the corner portion C1 can be formed in the second region A2. As a result, the corner portion C1 can be formed sharp, and the small contact width can be obtained.

Also, the manufacturing method of the second ring 1 according to Embodiment 1 includes the surface treatment step of forming, on the outer circumferential surface of the ring 3 obtained by the cutting step, the hard coating including the layer of at least one of the PVD treated film, the DLC film and the chrome-plated film. Consequently, the frictional force in the outer circumferential surface 11 of the second ring 1 can be reduced, and the abrasion resistance can be improved. Note that the above coating does not have to be formed on the outer circumferential surface 1 of the second ring 1.

Furthermore, the wire 2 according to Embodiment 1 is formed so that a distance d1 from the top P1 of the protruding surface S2 to the edge E1 of the third side surface 23 on the second direction side and a distance d2 from the top P1 to the edge E2 of the fourth side surface 24 on the second direction side are equal to each other (see FIG. 3). Then, the surface treatment step is performed in the state where the rings 3 are stacked in the axial direction so that the respective central axes are aligned with one another. According to this embodiment, as illustrated in FIG. 7, in the surface treatment step, the third side surface 23 and the fourth side surface 24 of two rings 3 adjacent in the axial direction that face each other are superimposed on each other without creating a step in the radial direction (without shifting). Therefore, coatings can be inhibited from being formed on the third side surface 23 and the fourth side surface 24. Such a surface treatment method is suitable for a case where PVD coatings are formed on the plurality of rings 3. Further, a method other than the surface treatment method illustrated in FIG. 7 may be adopted.

Further, in a case of forming the coating on the outer circumferential surface of the ring 3 by use of the vapor deposition method (e.g., the PVD method) of adhering, to the wire, the particles emitted from the target and forming the film on the surface of the substance, as illustrated in FIG. 7, the film forming treatment is performed in the state where the outer circumferential surface (the first side surface 21) of the ring 3 faces the target. According to the wire 2, since the second inclined surface S4 inclined to decrease the width toward the first direction connects the protruding surface S2 and the fourth side surface 24, the particles emitted from the target can be easily adhered to an entire area of the second inclined surface S4. As a result, the coating with a film thickness having high uniformity can be formed on the second inclined surface S4. Further, the surface treatment method other than the vapor deposition method may be adopted.

Here, it is preferable that, as illustrated in FIG. 3, when a distance parallel to the first direction between a third virtual surface F3 extending from the fourth side surface 24 in the second direction and the top P1 of the protruding surface S2 is H1, a distance vertical to the first virtual surface F1 between the first virtual surface F1 and the top P1 is h1, a width of the first part S21 intersecting the first virtual surface F1 in a direction parallel to the first virtual surface F1 in the cross section orthogonal to the extending direction of the wire 2 is K1, and an inclination angle of the second inclined surface S4 to the second direction is θ1, conditions of following equations (1) to (4) are satisfied.

$$0.01 \text{ mm} \leq H1 \leq 0.2 \text{ mm} \quad (1)$$

$$0.005 \text{ mm} \leq h1 \leq 0.02 \text{ mm} \quad (2)$$

$$0.05 \text{ mm} \leq K1 \leq 0.15 \text{ mm} \quad (3)$$

$$\theta1 \geq 3° \quad (4)$$

According to this configuration of the wire 2, the contact surface with a smaller and uniform contact width can be formed on the second ring 1. Note that it is preferable that an upper limit value of the above θ1 is 25°.

[Contact Width Evaluation]

A contact width of a second ring manufactured by the above described manufacturing method was evaluated.

Example

As an example, a second ring manufactured using the wire 2 according to Embodiment 1 illustrated in FIG. 2 and FIG. 3 was evaluated. An inclination angle θT of a tapered surface S1 to a first direction was set to 2.5°, and a lapping time in a polishing step was set to 50 seconds.

Comparative Example

As a comparative example, a second ring manufactured using the wire 4 according to the comparative example illustrated in FIG. 9 was evaluated. The comparative example was similar to the example except that an inclination angle θT was set to 3.2°.

[Evaluation Result]

Table 1 illustrates evaluation results of contact widths of the example and the comparative example. In the evaluation, an average value and a variation (a standard deviation) of contact widths in an entire circumference of each second ring were calculated. As illustrated in Table 1, in the example, the average value of the contact widths was 0.048 mm, and the variation was 0.033 mm. In the comparative example, the average value of the contact widths was 0.052 mm, and the variation was 0.065 mm. By comparison of the average value of the contact widths of the example with that of the comparative example, it has been confirmed that a contact surface with a smaller contact width is obtainable in the example than in the comparative example. Also, by comparison of the variation of the contact width of the example with that of the comparative example, it has been confirmed that the contact surface with more uniform contact width is obtainable in the example than in the comparative example.

TABLE 1

|  | Contact width | |
| --- | --- | --- |
|  | Average value (mm) | Variation (mm) |
| Example | 0.048 | 0.033 |
| Comparative example | 0.052 | 0.065 |

Embodiment 2

Figure 11:
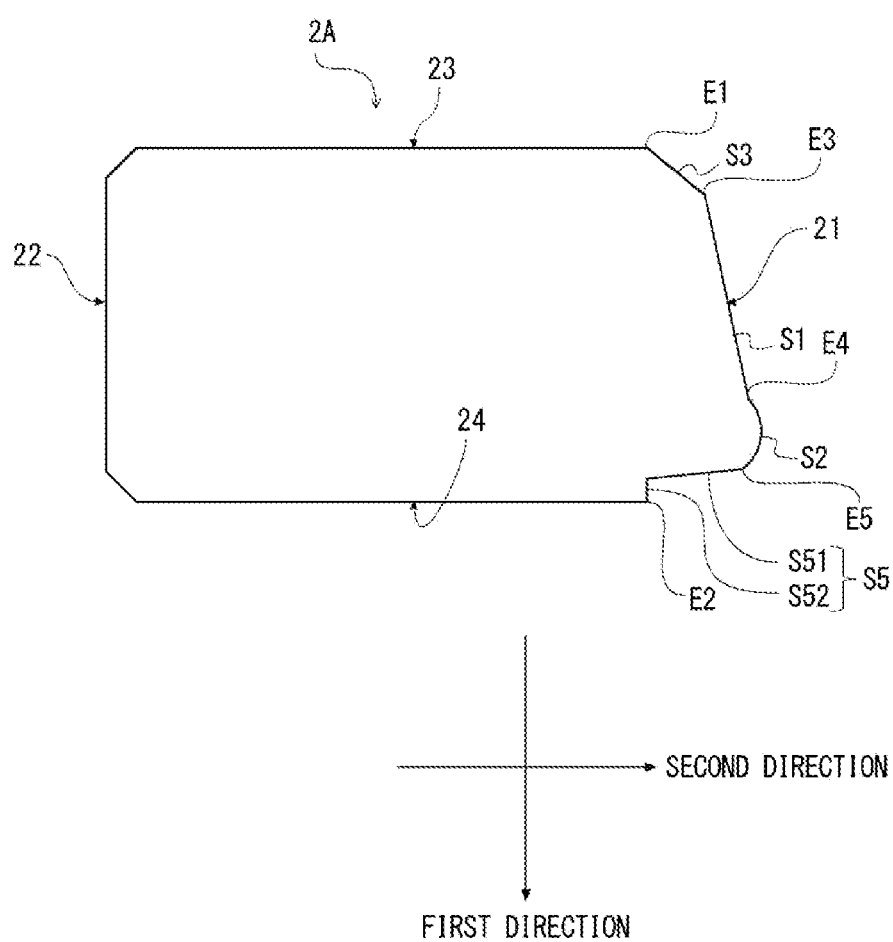
FIG. 11 is a view illustrating the wire according to Embodiment 2.

FIG. 10 is a view illustrating a second ring 1A manufactured using a wire 2A according to Embodiment 2. FIG. 10 illustrates a cross section of the second ring 1A orthogonal to a circumferential length direction. FIG. 11 is a view illustrating the wire 2A according to Embodiment 2. FIG. 11 illustrates a cross section orthogonal to an extending direction of the wire 2A. Hereinafter, differences of Embodiment 2 from Embodiment 1 will be mainly described, and a similar configuration will be denoted with the same reference numerals and symbols as in Embodiment 1 to omit detailed description.

As illustrated in FIG. 10, the second ring 1A according to Embodiment 2 is a so-called scraper ring including a stepped (step-shaped) cutout formed in a lower part on an outer circumferential surface side. An outer circumferential surface 11 of the second ring 1A includes a tapered surface 111, a contact surface 112, a first inclined surface 113 and a cut surface 115. The cut surface 115 connects an outer circumferential edge of a lower surface 14 and a lower edge of the contact surface 112 so that an undercut 15 being the stepped cutout is formed between the lower surface 14 and the contact surface 112. Consequently, in an internal combustion engine 100 in which the second ring 1A is mounted, a space made by the undercut 15 is formed between a lower part of the outer circumferential surface 11 and a cylinder 10. When this space forms an oil reservoir, a piston 20 lowers and the second ring 1A scrapes off oil in a gap PC1, oil is buffered, and rise in hydraulic pressure is inhibited. As a result, satisfactory oil scrape-off performance can be obtained.

As illustrated in FIG. 11, a first side surface 21 of the wire 2A according to Embodiment 2 includes a tapered surface S1, a protruding surface S2, a first inclined surface S3 and a cut surface S5. The cut surface S5 is a surface forming the cut surface 115 in the second ring 1A. The cut surface S5 is located on a first direction side of the tapered surface S1, and connects the protruding surface S2 and a fourth side surface 24. The cut surface S5 includes a first undercut surface S51 connected to the protruding surface S2, and a second undercut surface S52 connecting the first undercut surface S51 and the fourth side surface 24. The first undercut surface S51 corresponds to "a predetermined surface" according to the present invention. Also, in Embodiment 2, a virtual surface extending from the first undercut surface S51 to intersect a first virtual surface F1 is referred to as a second virtual surface F2.

Figure 12:
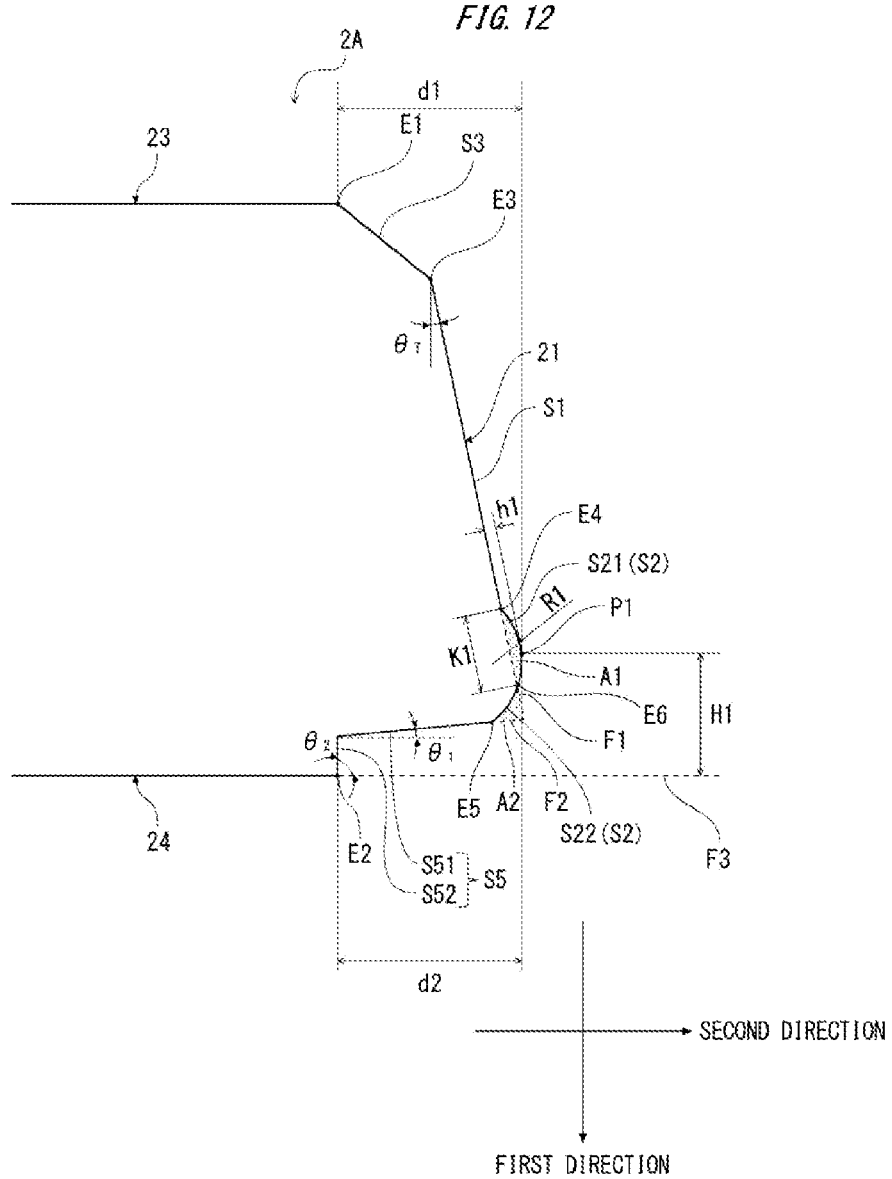
FIG. 12 is a view illustrating the wire according to Embodiment 2.

FIG. 12 is a view for explaining the first side surface 21 of the wire 2A. In Embodiment 2, an inclination angle of the first undercut surface S51 to a second direction is denoted with θ1. Further, an inclination angle of the second undercut surface S52 to the second direction is denoted with θ2. The first undercut surface S51 is inclined to decrease a width toward a first direction. Note that the first undercut surface S51 may extend along the second direction. That is, θ1 may be 0°. Further, the second undercut surface S52 extends along the first direction. That is, θ2 is 90°. Note that the second undercut surface S52 may be inclined to the first direction. However, in the cut surface S5, θ2 is set to be larger than θ1.

As illustrated in FIG. 12, similarly to the Embodiment 1, the protruding surface S2 of the wire 2A is divided, by the first virtual surface F1, into a first part S21 connected to the tapered surface S1 and protruding to the second direction side of the first virtual surface F1, and a second part S22 connecting the first part S21 and the first undercut surface S51 and located on an opposite side of the second direction of the first virtual surface F1. Then, the first part S21 includes a top P1 located on a most second direction side in the first side surface 21 and is curved in a protruding shape on the second direction side.

The second ring 1A according to Embodiment 2 can be manufactured by a manufacturing method described with reference to FIG. 4 and others in the same manner as in the second ring 1 according to Embodiment 1. That is, the second ring 1A is manufactured by the manufacturing method including a coiling step of sending out the wire 2A, and applying external force to the wire 2A to form the wire 2A in an annular shape, a cutting step of cutting the wire 2A formed in the annular shape to obtain a ring 3A, a surface treatment step of forming a hard coating on an outer circumferential surface (the first side surface 21) of the ring 3A, and a polishing step of polishing a surface of the ring 3A.

Figure 13:
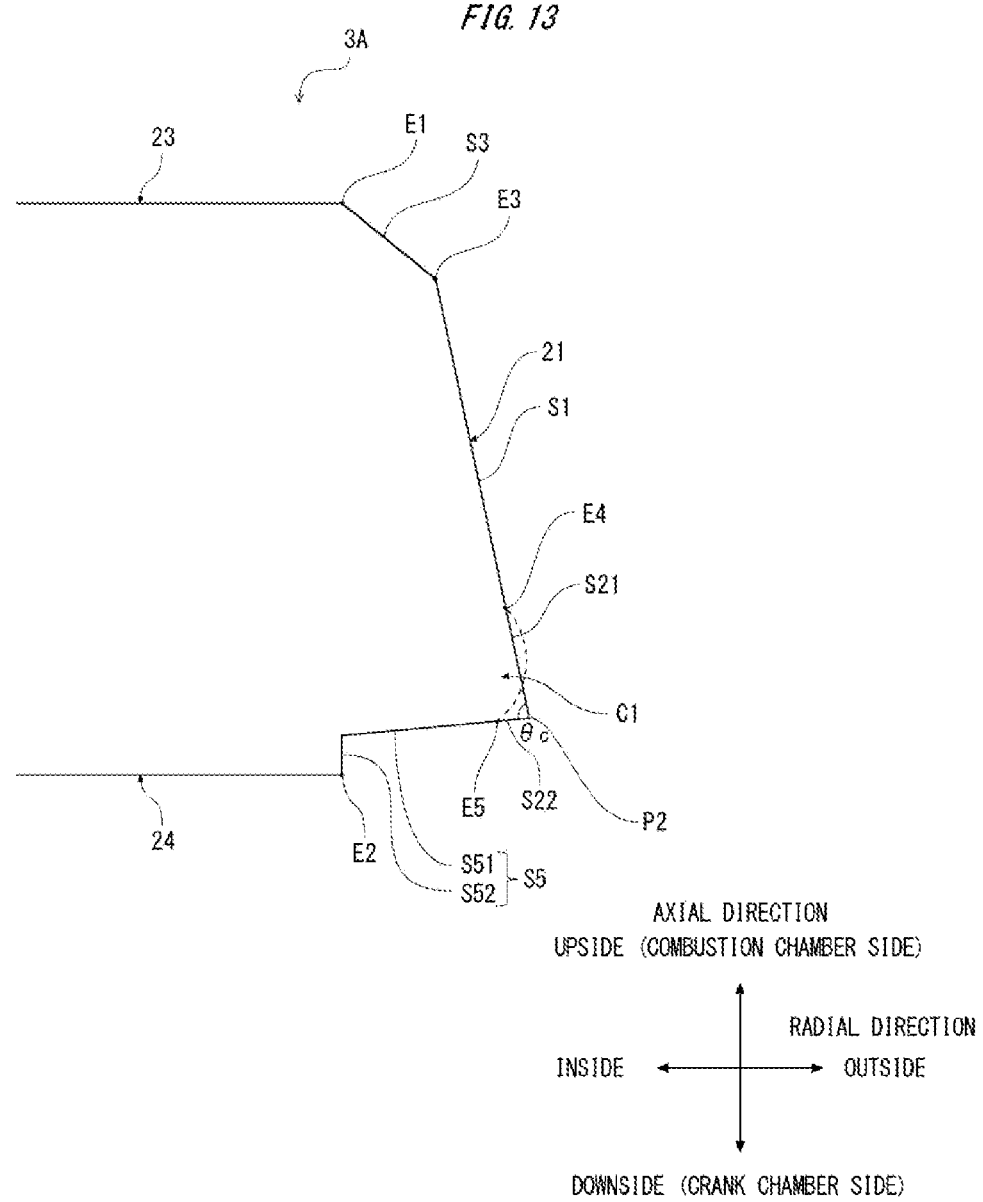
FIG. 13 is a view illustrating the outer circumferential surface of the ring obtained by a cutting step.
Figure 14:
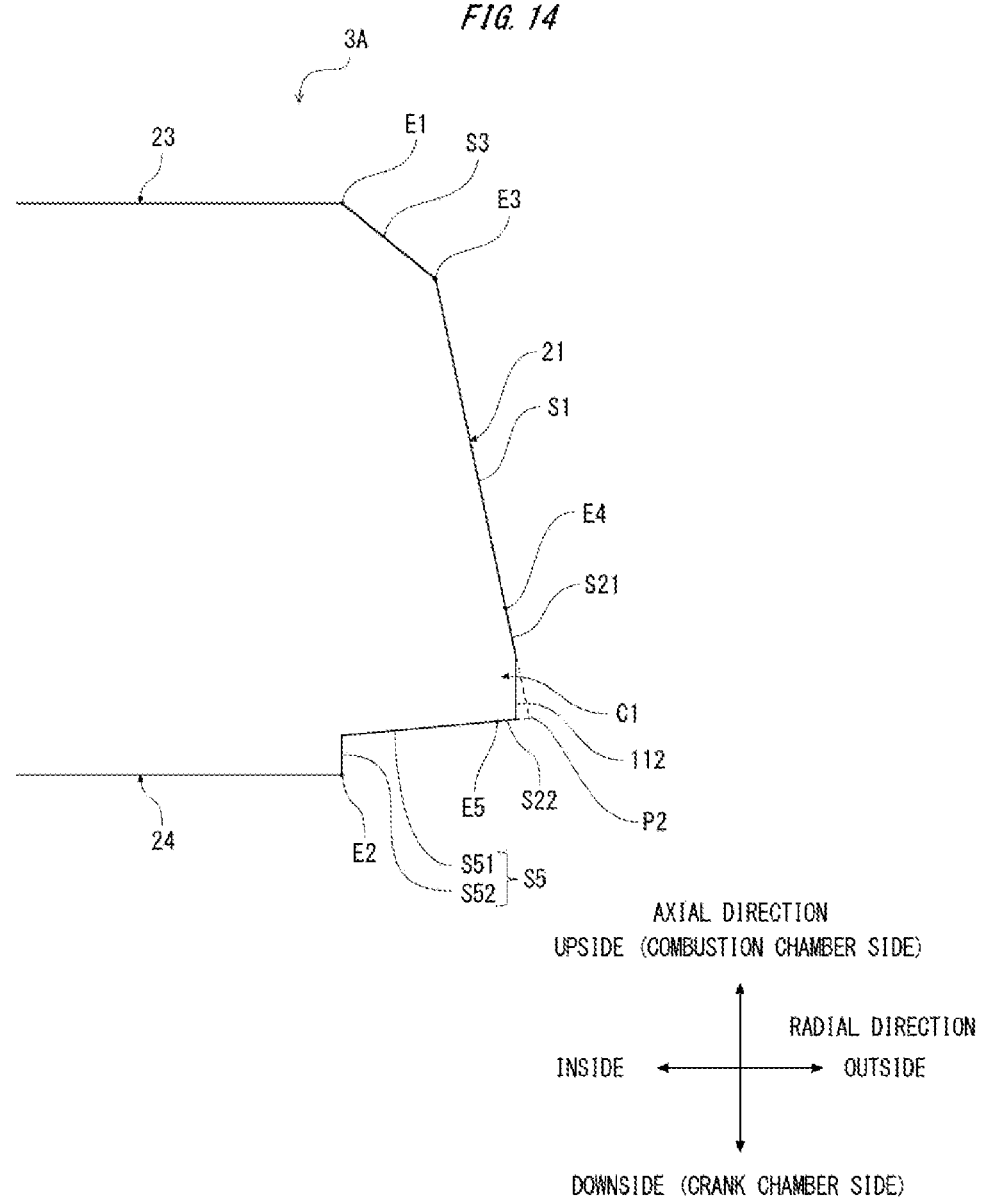
FIG. 14 is a view illustrating the outer circumferential surface of the ring after the polishing step.

FIG. 13 is a view illustrating the outer circumferential surface (the first side surface 21) of the ring 3A obtained by the cutting step. In the coiling step, the first part S21 of the protruding surface S2 is crushed on a first virtual surface F1 side by the external force acting on the first side surface 21 of the wire 2A. A corner portion C1 protruding outward in a radial direction is formed on the outer circumferential surface of the ring 3A is formed. The corner portion C1 is formed by the first part S21 substantially flat relative to the tapered surface S1 and the second part S22 substantially flat relative to the first undercut surface S51. FIG. 14 is a view illustrating the outer circumferential surface of the ring 3A after the polishing step. In the polishing step, a tip end P2 of the corner portion C1 is polished, and the flat contact surface 112 is formed.

Also, in Embodiment 2 described above, an effect similar to that of Embodiment 1 can be obtained. That is, in the wire 2A according to Embodiment 2, the corner portion C1 as a polishing target to form the contact surface is formed by the coiling step. Consequently, according to the wire 2A, a small contact width can be uniformly obtained. Also, in Embodiment 2, a surface of the corner portion C1 can be smoothed by a rolling effect in the coiling step. As a result, the contact width can be more uniform.

Also, in Embodiment 2, similarly to Embodiment 1, an area of a second region A2 is set to be larger than or equal to an area of a first region A1, and hence, the corner portion C1 can be formed in the second region A2. As a result, the corner portion C1 can be formed sharp, and a small contact width can be obtained. Further, a hard coating is formed on the outer circumferential surface of the ring 3A by the surface treatment step, so that frictional force in the outer circumferential surface 11 of the second ring 1A can be reduced, and abrasion resistance can be improved. Further, a distance d1 from the top P1 of the protruding surface S2 to an edge E1 of a third side surface 23 and a distance d2 from the top P1 to an edge E2 of the fourth side surface 24 are set to be equal to each other, so that in the surface treatment step, coatings can be inhibited from being formed on the third side surface 23 and the fourth side surface 24. Also, in Embodiment 2, conditions of equations (1) to (4) described above are satisfied, so that the contact surface with a smaller and uniform contact width can be formed on the second ring 1A.

Embodiment 3

Figure 15:
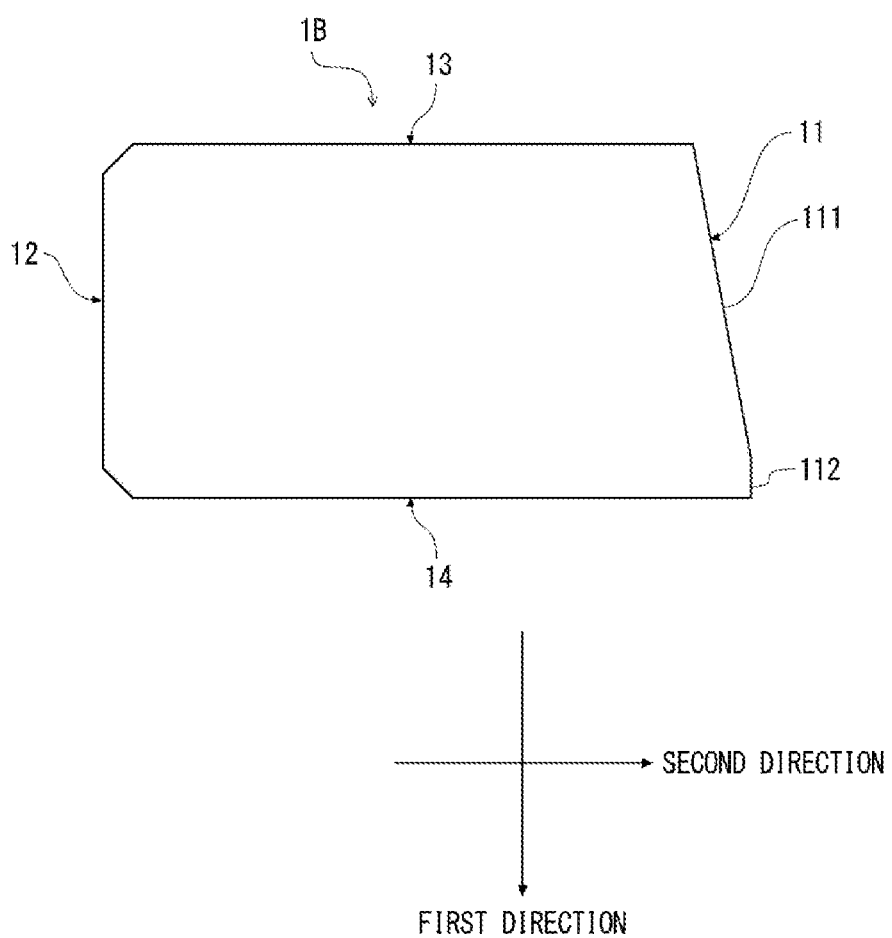
FIG. 15 is a view illustrating a second ring manufactured using a wire according to Embodiment 3.
Figure 16:
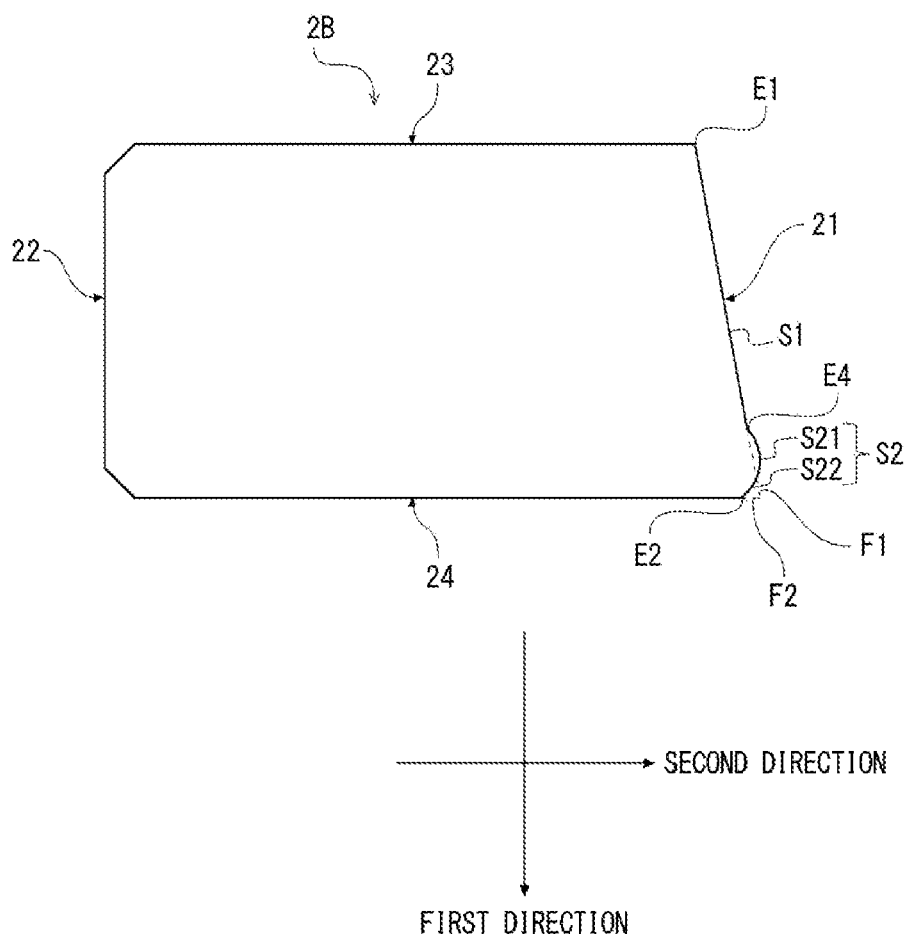
FIG. 16 is a view illustrating the wire according to Embodiment 3.

FIG. 15 is a view illustrating a second ring 1B manufactured using a wire 2B according to Embodiment 3. FIG. 15 illustrates a cross section of the second ring 1B orthogonal to a circumferential length direction. FIG. 16 is a view illustrating the wire 2B according to Embodiment 3. FIG. 16 illustrates a cross section orthogonal to an extending direction of the wire 2B. In Embodiment 1 described above, the second inclined surface S4 corresponds to "the predetermined surface" according to the present invention, and in Embodiment 2, the first undercut surface S51 of the cut surface S5 corresponds to "the predetermined surface", but the wire according to the present invention does not have to include the second inclined surface S4 or the cut surface S5 described above. In the wire 2B illustrated in FIG. 16, a fourth side surface 24 forming a lower surface 14 in the second ring 1B corresponds to "the predetermined surface" according to the present invention, and a protruding surface S2 connects a tapered surface S1 and the fourth side surface 24.

<Others>

As above, suitable embodiments of the present invention have been described, and various aspects described above can be combined as much as possible.

REFERENCE SIGNS LIST

1: second ring (an example of a piston ring)
2: wire
21: first side surface
22: second side surface
23: third side surface
24: fourth side surface (an example of a predetermined surface)
S1: tapered surface
S2: protruding surface
S21: first part
S22: second part
S3: first inclined surface
S4: second inclined surface (an example of the predetermined surface)
S5: cut surface
S51: first undercut surface (an example of the predetermined surface)
S52: second undercut surface
P1: top
F1: first virtual surface
F2: second virtual surface
F3: third virtual surface
C1: corner portion
A1: first region
A2: second region

The invention claimed is:

1. A wire for a piston ring, the wire forming a material of the piston ring to be mounted in a ring groove of a piston in an internal combustion engine, the wire comprising:

a first side surface forming an outer circumferential surface in the piston ring, a second side surface forming an inner circumferential surface in the piston ring, a third side surface connecting the first side surface and the second side surface and forming a surface facing an inner wall of the ring groove on a combustion chamber side in the piston ring, and a fourth side surface connecting the first side surface and the second side surface and forming a surface facing an inner wall of the ring groove on a crank chamber side in the piston ring, wherein the first side surface comprises a tapered surface inclined to increase a width toward a first direction that is a direction from a side of the third side surface toward a side of the fourth side surface in a cross section orthogonal to an extending direction of the wire, and a protruding surface connecting the tapered surface and a predetermined surface located on the first direction side of the tapered surface and protruding on a side of a second direction that is a direction from the second side surface toward the first side surface, the protruding surface is divided, by a first virtual surface extending from the tapered surface to the first direction side, into a first part connected to the tapered surface and protruding to the second direction side of the first virtual surface, and a second part connecting the first part and the predetermined surface and located on an opposite side of the second direction of the first virtual surface, the first part includes a top located on a most second direction side in the first side surface and is formed in a protruding shape on the second direction side, and the first side surface including, as the predetermined surface, an inclined surface connecting the protruding surface and the fourth side surface and being inclined to decrease a width toward the first direction in the cross section orthogonal to the extending direction of the wire.

2. A wire for a piston ring, the wire forming a material of the piston ring to be mounted in a ring groove of a piston in an internal combustion engine, the wire comprising:

a first side surface forming an outer circumferential surface in the piston ring, a second side surface forming an inner circumferential surface in the piston ring, a third side surface connecting the first side surface and the second side surface and forming a surface facing an inner wall of the ring groove on a combustion chamber side in the piston ring, and a fourth side surface connecting the first side surface and the second side surface and forming a surface facing an inner wall of the ring groove on a crank chamber side in the piston ring, wherein the first side surface comprises a tapered surface inclined to increase a width toward a first direction that is a direction from a side of the third side surface toward a side of the fourth side surface in a cross section orthogonal to an extending direction of the wire, and a protruding surface connecting the tapered surface and a predetermined surface located on the first direction side of the tapered surface and protruding on a side of a second direction that is a direction from the second side surface toward the first side surface, the protruding surface is divided, by a first virtual surface extending from the tapered surface to the first direction side, into a first part connected to the tapered surface and protruding to the second direction side of the first virtual surface, and a second part connecting the first part and the predetermined surface and located on an opposite side of the second direction of the first virtual surface, the first part includes a top located on a most second direction side in the first side surface and is formed in a protruding shape on the second direction side, the first side surface includes a cut surface connecting the protruding surface and the fourth side surface, the cut surface includes a first undercut surface as the predetermined surface, connected to the protruding surface, and a second undercut surface connecting the first undercut surface and the fourth side surface, and an inclination angle of the second undercut surface to the second direction is larger than an inclination angle of the first undercut surface to the second direction.

3. The wire for the piston ring according to claim 1, wherein when a distance parallel to the first direction between a third virtual surface extending from the fourth side surface in the second direction and the top is H1, a distance vertical to the first virtual surface between the first virtual surface and the top is h1, a width of the first part intersecting the first virtual surface in a direction parallel to the first virtual surface in the cross section orthogonal to the extending direction of the wire is K1, and an inclination angle of the predetermined surface to the second direction is θ1, conditions are satisfied:

0.01 mm≤H1≤0.2 mm;

0.005 mm≤h1≤0.02 mm;

0.05 mm≤K1≤0.15 mm; and

θ1≤3°.

4. A manufacturing method of a piston ring for manufacturing, from the wire according to claim 1, the manufacturing method of the piston ring comprising:

a coiling step of sending out the wire, and applying external force to the wire to form the wire in an annular shape, a cutting step of cutting the wire formed in the annular shape to obtain a ring, and a polishing step of polishing a surface of the ring, wherein in the coiling step, the first part is crushed on a side of the first virtual surface by the external force acting on the first side surface, and the protruding surface is deformed to form a corner portion, and in the polishing step, a tip end of the corner portion is polished to form a flat contact surface.

5. A manufacturing method of a piston ring for manufacturing, from the wire according to claim 2, the manufacturing method of the piston ring comprising:

a coiling step of sending out the wire, and applying external force to the wire to form the wire in an annular shape, a cutting step of cutting the wire formed in the annular shape to obtain a ring, and a polishing step of polishing a surface of the ring, wherein in the coiling step, the first part is crushed on a side of the first virtual surface by the external force acting on the first side surface, and the protruding surface is deformed to form a corner portion, and in the polishing step, a tip end of the corner portion is polished to form a flat contact surface.

* * * * *